United States Patent [19]
Priem et al.

[11] Patent Number: 6,065,071
[45] Date of Patent: May 16, 2000

[54] METHOD AND APPARATUS FOR TRAPPING UNIMPLEMENTED OPERATIONS IN INPUT/OUTPUT DEVICES

[75] Inventors: Curtis Priem, Fremont; David S. H. Rosenthal, Palo Alto, both of Calif.

[73] Assignee: Nvidia Corporation, Santa Clara, Calif.

[21] Appl. No.: 09/048,902

[22] Filed: Mar. 26, 1998

[51] Int. Cl.[7] .................................................. G06F 13/16
[52] U.S. Cl. .................................. 710/22; 710/52; 710/57
[58] Field of Search .................................. 710/22, 24, 52, 710/56, 57

[56] References Cited

U.S. PATENT DOCUMENTS

| 4,703,449 | 10/1987 | Berman | 707/205 |
|---|---|---|---|
| 4,716,543 | 12/1987 | Ogawa et al. | 707/205 |
| 5,708,849 | 1/1998 | Coke et al. | 710/22 |

FOREIGN PATENT DOCUMENTS 62-3455  1/1987  Japan .

*Primary Examiner*—Thomas C. Lee
*Assistant Examiner*—Thuan N. Du
*Attorney, Agent, or Firm*—Limbach & Limbach L.L.P.

[57] ABSTRACT

Apparatus and a method by which the flow of DMA-transferable data from an application program to an input/output device using a direct memory access circuit may be halted when the device is unable to respond to DMA-transferable data sent to it. The apparatus includes circuitry for ascertaining whether the input/output device is able to respond to DMA-transferable data transferred to the input/output device, a circuit for storing the DMA-transferable data transferred to the input/output device to which the input/output device is unable to respond, and circuitry for generating a signal to disable immediately the flow of DMA-transferable data to the input/output device and an interrupt to assure that the DMA-transferable data is handled in an expeditious manner.

9 Claims, 7 Drawing Sheets

METHOD AND APPARATUS FOR TRAPPING UNIMPLEMENTED OPERATIONS IN INPUT/OUTPUT DEVICES

BACKGROUND OF THE INVENTION

1. Field of the Invention

This invention relates to computer circuitry and, more particularly, to apparatus and a method for trapping unimplemented operations in input/output devices which include first-in first-out (FIFO) buffers.

2. History of the Prior Art

Modern computer system are typically based on an architecture which was first offered in the Digital Equipment Corporation (DEC) PDP11 computer. One problem with this architecture as with earlier IBM and CDC mainframe architectures is that writing directly to the input/output devices of the system by an application program is prohibited. Although this architecture allows all of the facilities of the central processing unit to be used for input/output, it requires that the operating system running on the central processing unit attend to all of the input/output functions using trusted code. This significantly slows any input/output operation of the computer.

In contrast to earlier mainframe systems, in this architecture there is no process by which the input/output performance of the system can be increased except by increasing the speed of the central processing unit or the input/output bus. This is an especial problem for programs which make heavy use of input output/devices such as video and game programs which manipulate graphics and high quality sound extensively.

In a modern computer, the central processing unit and the input/output devices operate at different speeds. It can be very inefficient for a modern central processing unit to wait until an input/output write operation is complete before performing the next operation which often has nothing to do with input/output. On the other hand, a central processing unit has to wait for the result of a read operation because it needs the result produced.

Since most central processing unit accesses to input/output devices are write operations, the designers of systems and input/output devices attempt to decouple the central processing unit and input/output devices as far as write operations are concerned by implementing write queues using first-in first-out (FIFO) write buffers. These buffers may appear at various places in a particular implementation: as a part of the central processing unit, as part of a bridge chip, or as part of an input/output device.

A new input/output architecture has been invented which overcomes the problems of the prior art PDP11 architecture and allows application programs to write directly to input/output devices. This architecture uses FIFO buffers at the input of an input/output control unit to allow the central processing unit and the input/output devices to be decoupled in order to increase the speed of operation. The new architecture including such a FIFO input buffer is described in U.S. Pat. No. 5,696,990, entitled Method and Apparatus for Providing Improved Flow Control For Input/Output Operations a Computer System Having a FIFO Circuit And An Overflow Storage Area, issued Dec. 9, 1997, to Rosenthal et al.

One problem raised by this new architecture is that an input/output device and the buffers supplying it must accept all information written to them over the input/output bus in order to implement the architecture. Individual input/output devices may not implement many of the commands in hardware. Some of the operations commanded may be implemented in software while other of these operations commanded may have been generated in error. Consequently, it is desirable to provide a means for handing unimplemented operations in input/output devices which include first-in first-out (FIFO) buffers.

In the new input/output architecture, it was contemplated that an application program executing on a central processor would write all commands directly to the FIFO buffers. Because of the limited size of such buffers, the variable amounts of data to be transferred, and the need for the central processor to read a register associated with the FIFO buffers in order to know whether additional commands could be written to the buffers, the process of having the central processor write directly to the FIFO and the associated I/O devices is not always fast enough.

It is desirable to provide circuitry and a method for accomplishing faster writes of data directly from an application program to I/O devices while providing means for handing unimplemented operations in input/output devices which include first-in first-out (FIFO) buffers.

SUMMARY OF THE INVENTION

The objects of the present invention are realized by an apparatus and a method by which the flow of information transferred by a direct memory access (DMA) controller to an input/output device may be halted when the input/output device is unable to respond to the information decoded to its address space. The apparatus includes DMA circuitry for transferring information from a memory buffer established by an application program, circuitry for ascertaining whether the input/output device is able to respond to information being transferred, a circuit for storing the information transferred to the input/output device to which the input/output device is unable to respond, and circuitry for generating a signal to disable immediately the flow of information to the input/output device and an interrupt to assure that the information is handled in an expeditious manner.

These and other objects and features of the invention will be better understood by reference to the detailed description which follows taken together with the drawings in which like elements are referred to by like designations throughout the several views.

DETAILED DESCRIPTION

Figure 1:
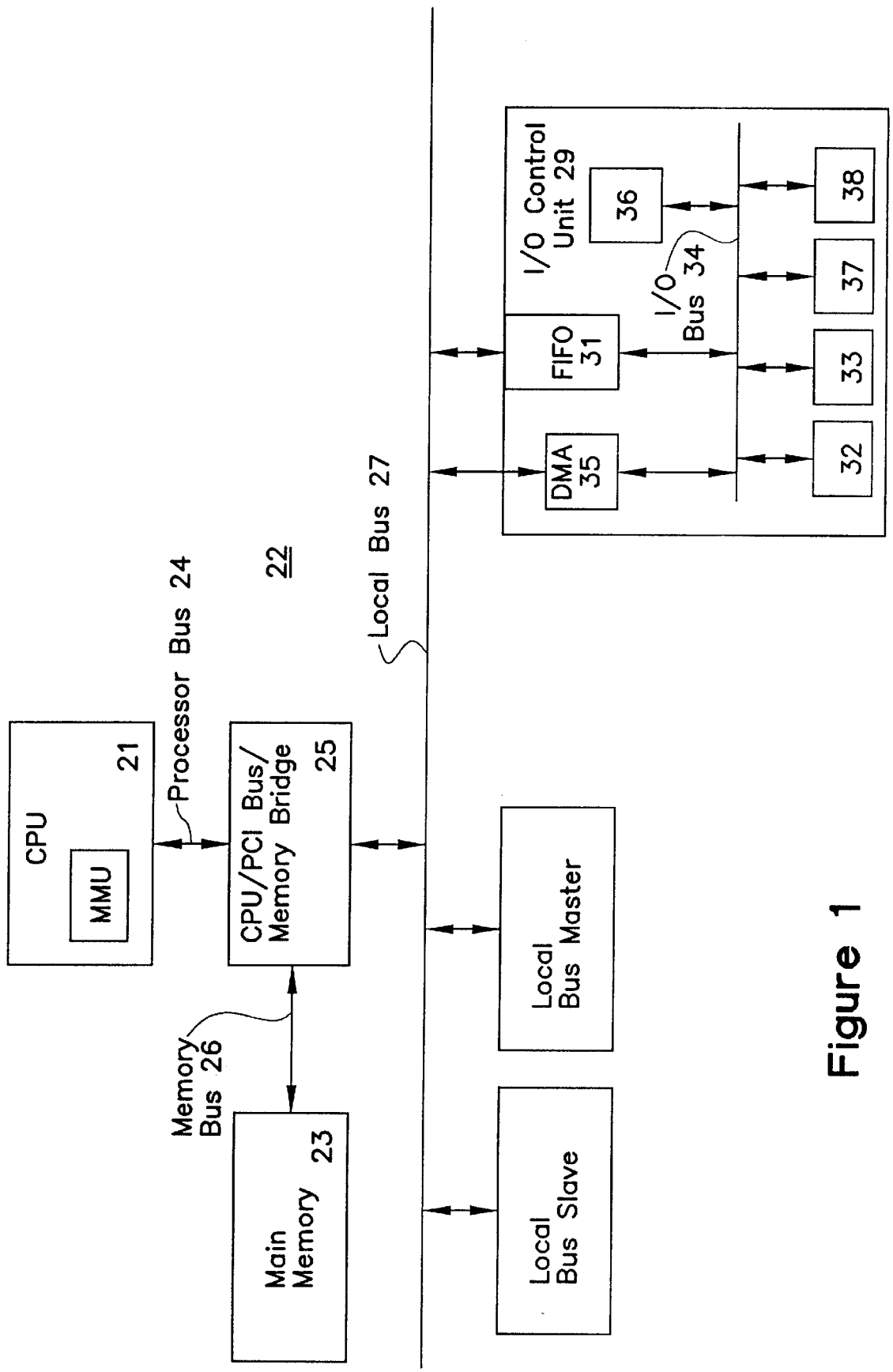
FIG. 1 is a block diagram of a computer system which may utilize the present invention.

FIG. 1 is a block diagram of a computer system 22 which has been devised to overcome the problems of the prior art. The system 22 provides a new input/output architecture which cooperates with other components of present systems based on the PDP11 architecture, yet is able to drastically increase the speed of input/output operations for new application programs. In order to accomplish this, the new architecture of the system allows write operations by application programs to be made directly to the input/output devices. This eliminates the cumbersome multi-step software processes invoked by prior art systems using the operating system and trusted code for every input/output access.

In order to accomplish the process safely, the input/output architecture of the system 22 utilizes an input/output control unit 29 which provides its own virtual name-to-physical-device and context translation for all of the input/output devices associated with the new control unit 29 on its own device bus 34. By enforcing this translation, application programs can write directly to input/output devices without affecting assets of other application programs. Once this translation from virtual names furnished by the application programs to addresses of physical input/output devices on the device bus is accomplished and context has been furnished to the input/output devices, translation of addresses of input/output devices on the input/output bus into physical addresses on the device bus 34 is accomplished directly by hardware at the input/output control unit 29. This hardware also checks permissions; and, when an operation is known to be safe, it is performed by hardware. When a translation operation fails, the operating system software is invoked.

The architecture of the system 22 has been designed so that it eliminates almost all read operations of input/output devices by the central processing unit. In order to accomplish this, the input/output control unit 29 includes a first-in first-out (FIFO) unit 31 for storing write operations directed to the input/output control unit. The FIFO unit 31 queues incoming write operations. Unlike FIFO units in prior art systems, it stores both the address and data of each command. This allows the write operations to the input/output control unit 29 to occur asynchronously so that both the central processing unit 21 and the input/output control unit 29 may be functioning independently of one another and neither need wait for operations of the other.

To help maintain this asynchronous operating arrangement and to eliminate read operations to the extent possible, the input/output control unit also includes an advanced direct memory access (DMA) device 35 which provides direct memory access for operations conducted involving input/output devices. The DMA device 35 allows the results of input/output operations to be written from input/output devices to main memory 23 rather than requiring read operations by the central processing unit 21 to obtain these results.

In accordance with the present invention, the DMA device 35 is also used to accomplish very rapid transfers of an essentially unlimited number of commands from an application program to I/O devices without the need to call the operating system to accomplish address translations for individual commands or to check the safety of the particular I/O operation.

Although the input/output architecture of system 22 may be used with systems utilizing a single input/output bus for all operations, the preferred embodiment of system 22 functions as well in a system utilizing a local bus 27 such as the Peripheral Component Interconnect (PCI) bus, the graphics bus called an AGP bus by Intel Corporation, or the Video Electronics Standards Association (VESA) local bus any of which may be associated with other input/output buses. While the discussion of this specification will assume that bus 27 is a local bus, the local bus 27 is also referred to in this specification as the input/output bus 27 and the system bus in order to emphasize its use. In arrangements utilizing local buses, the central processing unit 21 and main memory 23 are typically arranged on a processor bus 24 and a memory bus 26, respectively, and are joined to a bridge unit 25. The central processing unit 21 typically includes a memory management unit. The bridge unit 25 provides write buffering for operations between the central processing unit 21 and the input/output bus 27, between the central processing unit 21 and main memory 23 on the processor bus 24 and the memory bus 26, and between the input/output bus 27 and main memory 23.

The General Operation of the Input/Output Unit 29

Figure 2:
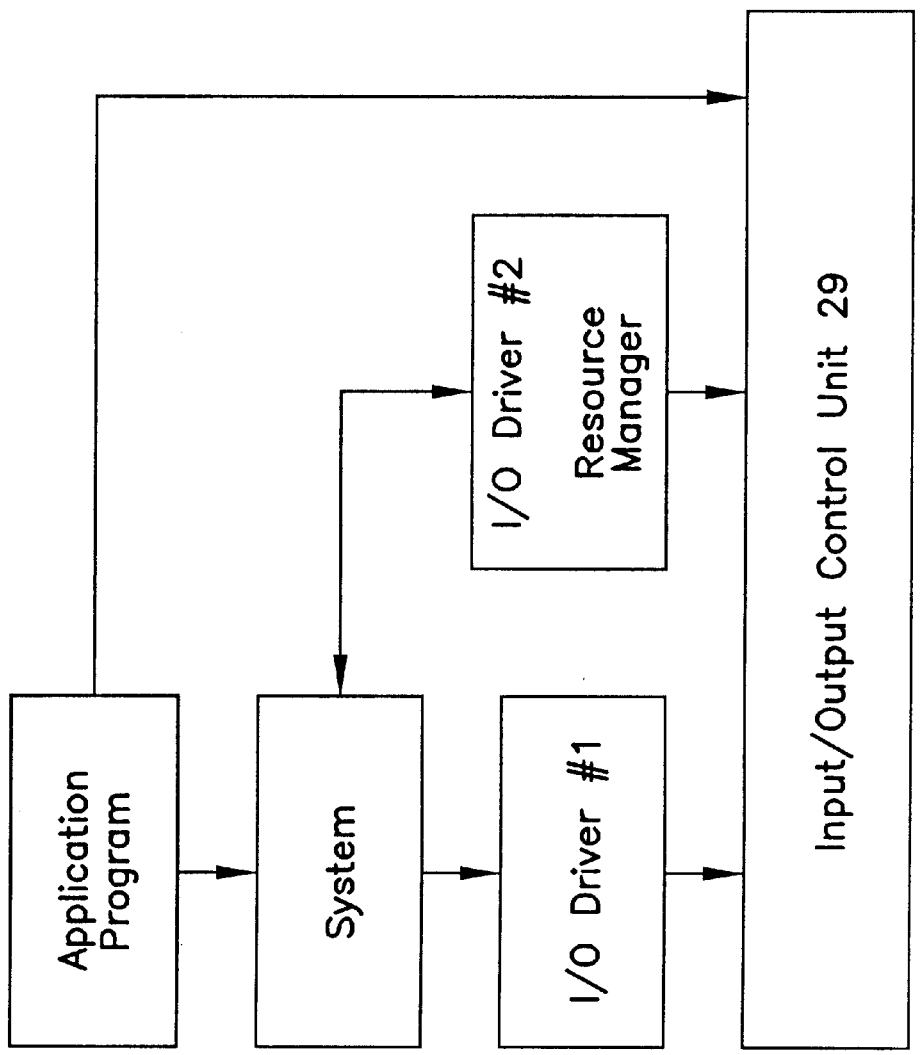
FIG. 2 in a diagram illustrating the operation of software in the architecture of the present invention.

FIG. 2 illustrates the manner in which operations are conducted by software in the new architecture. An application program which utilizes the new architecture may issue a command requesting permission from the operating system to map certain of the physical addresses decoded by the input/output control unit 29 into the address space of the application program. The operating system, using a new I/O driver #1, allots some portion of the system physical addresses which the input/output control unit 29 is decoding to the particular application program address space for its use only and installs the virtual-to-physical input/output bus address translations for the application program in the memory management unit. In a typical computer system, the memory management unit stores translations for what are referred to as pages of memory. If the size of the portion of system physical addresses allotted to an application program is a multiple of the memory management unit page size, then the I/O driver #1 can use the memory management unit to ensure that no more than one application program may access each area.

Installing the appropriate translations in the memory management unit of the central processing unit 21 creates a path around the operating system by which the application program executing on the central processor may directly read from and write to the hardware of the input/output control unit 29. The application program then writes to these allotted input/output bus addresses providing as data a virtual name of its choice for an input/output device on the device bus 34. The input/output control unit 29 takes the input/output address and the virtual name and uses it to install a translation from input/output bus addresses to device bus addresses in its internal hardware and to place the context required by the application program in that input/output device. Once this has occurred and for so long as the application program continues to run, the application program writes commands which the memory management unit associated with the central processing unit translates to the physical addresses on the input/output bus 27 for the input/output control unit 29; and the input/output control unit 29 further translates the input/output bus addresses of the commands to physical addresses of input/output devices on the device bus 34. In this way, the application may write directly to the input/output unit in order to utilize an input/output device such as the graphics output controller 33 without requiring any software intervention by the operating system. As will be understood from the more detailed description which follows, the use of many identically-sized input/output device address spaces each assigned for use only by one application program allows the input/output addresses to be utilized to determine which application program has initiated any particular input/output write operation.

Area Addresses

When an application program desires to write to an input/output device on the device bus 34, it addresses that device using an address for the address space assigned by the driver #1. Decoding circuitry decodes the address by reviewing a number of the highest order bits decoded by the chip sufficient to indicate a unique portion of the input/output address space assigned to an application program and places the command in the FIFO buffer 31. The FIFO buffer 31 handles at one time commands from only the application program to which the address area has been mapped.

The unit 29 receives physical addresses furnished by the memory management unit and virtual names furnished by application programs for operations to be performed which have been sent to the FIFO unit 31 and controls the translation of those virtual names for all input/output devices. The hardware unit 29 includes the device bus 34 to which the individual input/output devices such as a disk controller 32, a graphics output controller 33, and a sound generator 37 are shown joined. The unit 29 also includes a DMA unit 35 which is adapted to transfer data between the individual input/output devices and main memory for use by the central processing unit or other components of the system. As will be discussed below, this DMA unit 35 is utilized in practicing the present invention.

Database of Safe Translations for Input/Output devices

A second system driver called a "resource manager" maintains a database of data structures which include safe translations for input/output operations utilizing the physical input/output devices associated with the input/output control unit 29. A safe translation for an application to utilize an input/output device requires a correct physical address for the device and correct context for the device to function appropriately with the application program. These data structures include the physical address on the device bus 34 of the hardware which provides the input/output function and any context required by the hardware for operation with the application program.

When the application program wants to utilize an input/output device, the application program writes the virtual name chosen with a special calling command which calls an object representing the input/output device. The resource manager looks up the named data structure including (for a physical device) the safe translation and finds the context and physical address on the device bus 34 for the particular input/output device described by the name. The resource manager places the safe translation including the physical address and context in hardware to provide a translation from the input/output bus addresses. The resource manager causes any changes necessary to be made to the context on the input/output device which has been called. Thus, when later commands are sent to the same input/output device from the application program, they are routed by hardware to the particular addressed input/output device on the device bus 34.

Unsafe Operations

In any case in which the input/output device to which the operation is directed is unknown to the control unit 29, the unit 29 calls the resource manager which runs on the central processing unit and functions as a portion of the operating system. The resource manager determines how the operation is to be handled. The operation may be a write by a new application program requiring various set up operations before it may proceed. If an operation requires context changes at the input/output device, this is handled by the resource manager. If an operation requires a procedure which is not yet in order under the operating system such as requiring data from memory which is not in memory at that time, the resource manager transfers the command to the operating system to perform the necessary memory transfers (or the like) which allow the commanded operation to proceed. Alternatively, the operation may be directed to a device which is not otherwise associated with the control unit 29 such as a LAN interface or other bus master or slave on the input/output bus 27 which is not designed to cooperate with the unit 29. If such a device is addressed, the command is directed to the operating system by the resource manager and handled by the operating system in the normal manner for input/output devices of the prior art.

Address Translations in Hardware

When the operation involves a device directly associated with the control unit 29 including those on its device bus 34, the commands are sent by hardware directly to that device for execution. If the command requires that data be transferred to or from the application, the input/output device performs the transfer using the DMA unit 35. Upon the return of data in response to a command, the DMA unit 35 of the control unit 29 responds by transferring the data to main memory and notifying the central processing unit in a separate DMA operation of the existence of the data so that no local bus read operation by the central processing unit 21 is necessary to ascertain the result of the operation or to receive the data provided.

Commands not Implemented in Hardware

It will be seen that the new input/output architecture includes a number of unique features which allow it to accomplish its purposes. In order to allow application programs to write directly to input/output devices, the architecture provides for two stages of decoding. An application writes commands each including both data and address to the input/output control unit which decodes a very wide range of addresses. The input/output control unit provides a second stage of decoding in which safe translations are provided to uniquely-addressed but identically sized address sub-areas for each of the individual input/output devices which may be utilized.

Since each of these sub-areas of address space has an identical number of addresses, some input/output devices will have available more addresses than can be implemented practically. Thus, some addresses for which translations are provided to an input/output device will not be implemented. Other addresses may not be implemented by particular input/output devices in hardware but may be implemented by the resource manager in software. If a command which cannot be executed is decoded to a input/output device which accepts commands over a range of addresses, then the flow of commands to the input/output device must be halted or data will be lost. In prior art systems, this requires that the input/output device generate an interrupt, acquire the bus to notify the processor, clear all write queues in the bus pipeline, and then stop the transfer of data. In the present architecture, commands are transferred from the FIFO unit so by the time the processor is stopped, a significant number of commands will have been lost by overwriting registers in the input/output device. Since some of these commands should be carried out in software by the resource manager and others sent to the operating system, a new method for dealing with unimplemented commands is desirable.

Figure 3:
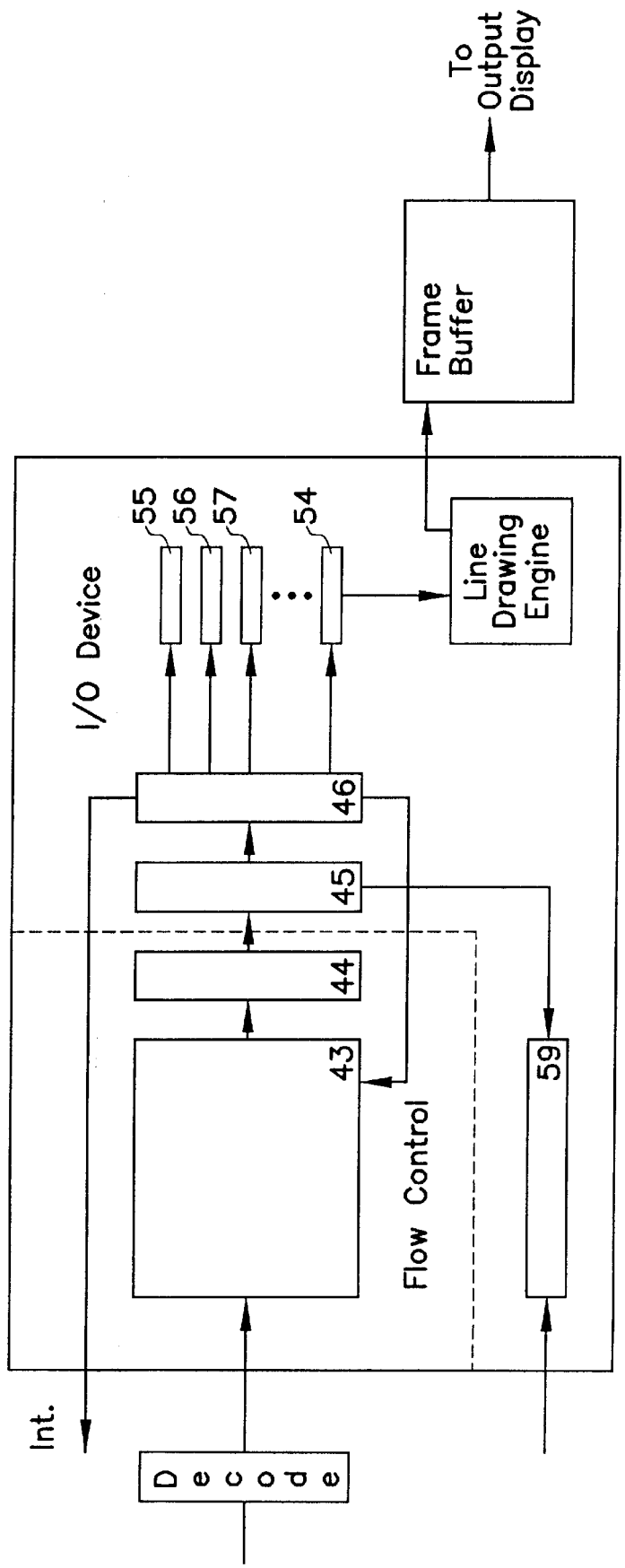
FIG. 3 is a block diagram of a particular input/output device which may utilize the present invention to achieve flow control for unimplemented commands in a computer system.

In order to prevent this loss of data and to allow commands to be implemented in software by the resource manager or by operating system software, an arrangement such as is illustrated in general in FIG. 3 may be utilized. In this arrangement, a first flow control circuit 43 is provided. The circuit 43 may be a first-in first-out (FIFO) circuit or similar circuitry having some means of flow control to stop the flow of commands during a period in which an interrupt is being generated and transferred to the central processing unit. In the preferred embodiment, the circuit 43 is implemented by the FIFO unit 31 of FIG. 1 and a register 39 (see FIG. 6) which is read by the central processing unit during operation to determine the number of additional commands which the FIFO unit 31 is capable of holding at any time. The central processing unit must test the register before sending any commands and is typically allowed to send no more than the number held by the register 39 so that the FIFO unit 31 cannot overflow.

The circuit 43 receives the commands (data and address) which are decoded from the system input/output bus and transfers them to an internal decoder circuit 44 which decodes a range of sequential addresses in the manner of the second stage decoder/address-translator in the input/output control unit 29 described above. The decoder 44 transfers all addresses within the sequential range to a FIFO circuit 45. The FIFO circuit 45 may be a one-stage FIFO buffer which is a part of the circuitry of an individual input/output device. The FIFO circuit 45 furnishes all of the commands it receives to a third decoder circuit 46. The third decoder circuit 46 may decode a range of addresses within the larger range decoded by the decoder circuit 44 for a register 54 (and for additional registers 55–58). The decoder 46 may also decode a single address for any of the registers 55–58. However, the decoder 46 decodes all of the addresses for functions which the associated input/output device can actually carry out. As may be seen, the decoder 46 and the registers 54–58 may be a part of the circuitry of a particular input/output device.

If there are any addresses decoded by the decoder 44 which cannot be carried out by the input/output device or other circuit addressed, then these addresses are not decoded by the decoder 46 but are transferred to storage circuit 59. The storage circuit 59 is adapted to store both the address and the data of the command. A failure to translate also causes the decoder 46 to generate an interrupt which is sent in the normal manner to the central processing unit on the bus and a signal which is transferred to the flow control circuit 43 to halt the transfer of data to the input/output device. This signal causes the commands in the flow control circuit 43 to be stopped during the period in which the processor is attending to the interrupt. The commands still being transferred from the central processing unit to the flow control circuit 43 will cease to flow when the value in the register 39 goes to zero indicating to the central processing unit that no further room remains for commands.

When the interrupt is received by the central processing unit, the central processing unit responding to operating system interrupt routines may read the command in the register and cause the resource manager to respond to that command in an appropriate manner. This allows the resource manager to carry out any necessary commands in software or to transfer the commands to the operating system. In the interim, the commands to the input/output device remain in the flow control circuit 40 ready to be executed as soon as the interrupt has been processed. In this manner, the command data is not lost even though the input/output device is unable to process any particular command transferred to it during burst or other mode of operation.

Specific Details of the New Architecture

Figure 6:
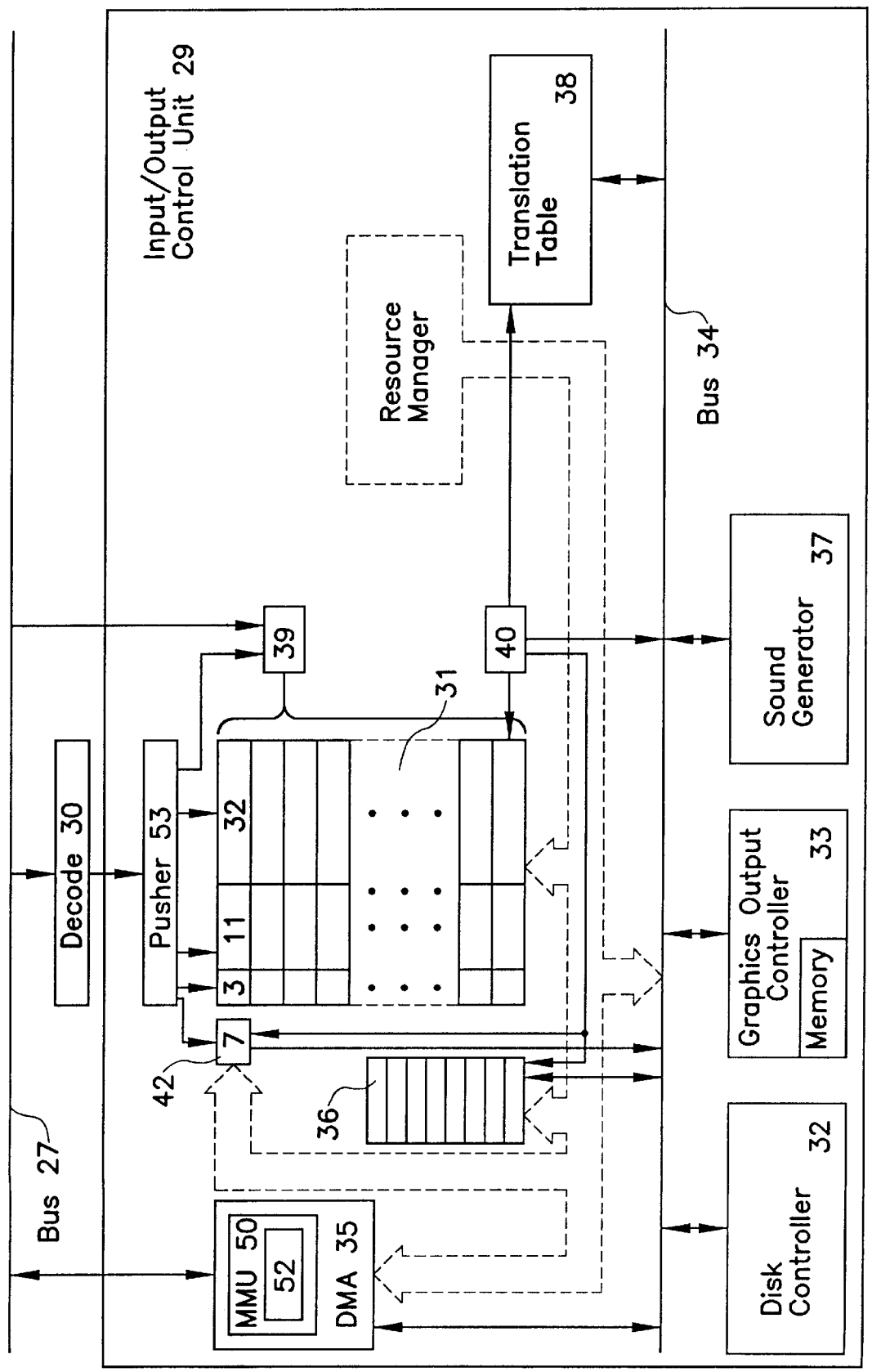
FIG. 6 is a block diagram of a specific embodiment of input/output circuitry used in a personal computer in accordance with the present invention.

FIG. 6 is a block diagram illustrating details of the input/output control unit 29 including the device bus 34 and the input/output devices arranged on that bus. As described above, the input/output control unit 29 includes a decode unit 30 which receives commands directly from the input/output bus 27 and transfers the commands to a pusher circuit 53 which transfers the command to the FIFO unit 31. The FIFO unit 31 stores the data along with the addresses for each of the commands being transferred to all of the input/output devices associated with the input/output control unit 29. In one embodiment, the FIFO buffer 31 includes thirty-two stages. The thirty-two stages allow the FIFO buffer to hold thirty-two individual serially ordered commands at any time.

Addresses

Figure 4:
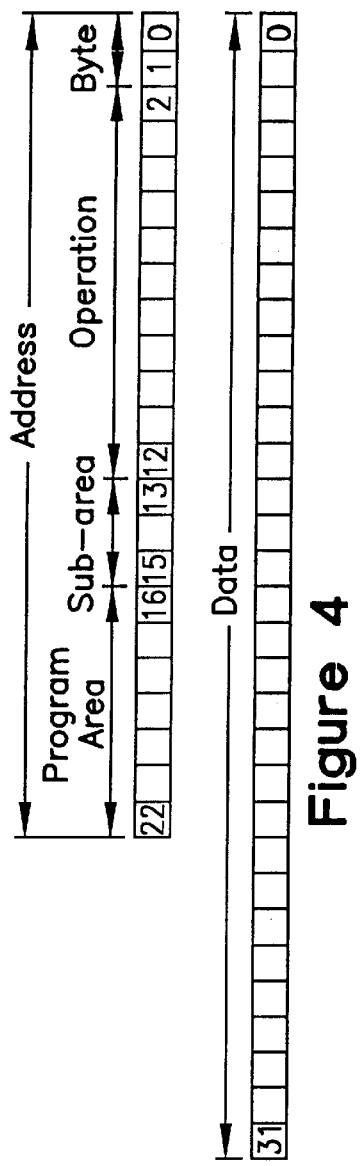
FIG. 4 illustrates the address and data bits utilized in one embodiment of the invention.

In one embodiment, the entries in the FIFO buffer 31 include thirty-two bits of data space and sixteen bits of the twenty-three bits of address space decoded by the input/output control unit 29. The remaining upper seven bits of the address which represent the 128 distinct areas of the address space which are available and thus define the particular application program are held in a register 42. The address and data space of the total command space (including that in the FIFO unit and the seven highest order bits defining the area assigned to the application program by the operating system) are pictured in FIG. 4. The twenty-three bits of address space are sufficient to map eight megabytes of address space on the input/output control unit 29. The eight megabytes of address space is divided into the 128 individual areas each having 64 Kbytes which may be allotted by the operating system to an application program.

When a first command from an application program is transferred to the input/output control unit 29, decoding circuitry sends the command to an input stage of the FIFO buffer 31 and the upper seven bits of the twenty-three address bits representing the area designated for that program are transferred to of the register 42.

Each of the 128 addressable areas is subdivided into eight separate sub-areas each having eight Kbytes of address space. The next lower three bits of the address space represent these eight sub-areas. The application treats each of these eight sub-areas identically, designating at various times various objects representing particular input/output devices and their context, as being accessed through each sub-area. As will be seen, each of these sub-area addresses represents one of eight registers which may store the physical address of an input/output device on the bus 34. The two lowest order bits of the address space represent byte positions in a command. In the preferred embodiment, the data is word aligned; and these bits are not included in the FIFO buffer 31. Consequently, eleven bits are left to represent a particular operation using the particular input/output device designated by the sub-area. With eleven bits of address space, 2048 individual operations (or portions thereof) are available for devices using addresses in each sub-area. In one embodiment, data structures (objects) are created in an object oriented programming language to represent the devices and their contexts which may be addressed in the sub-areas. The operations of the devices are then encoded as methods on each of these objects. This encoding of a sub-area as an object of a particular class is dynamic, and a new object representing a new device and its context may be encoded in the sub-area by an application program writing to offset zero, a special calling command which calls an address translation for a new device to the sub-area holding the address translation of an old object.

As pointed out above, when a program which is able to utilize the input/output system first requests that the operating system map a portion of the addresses decoded by the input/output control unit 29 to its address space, the operating system assigns physical addresses designating one of the 128 areas available for the input/output control unit 29 to the application. Since the I/O driver #1 is constructed never to map more than one application program to an area, the seven bits also identify the application program.

When an application program writes to the FIFO unit 31, the seven upper bits of the address are used to determine the sixty-four Kbyte area which it has been allotted by the operating system to that application. The three bit sub-area designation is used to select one of the eight Kbyte sub-areas which the application may allot to a device. The eleven bit offset is used to determine the method or operation to be carried out by the device, and the thirty-two bit data space is used for the data related to the commanded operation. In a typical write operation, the write to any particular eleven bit offset invokes a particular method (operation to be performed indicated by the eleven bits) on the object (the input/output asset designated by the present name for the sub-area). However, these bits are also interpreted to provide direct translations from virtual names to physical addresses of input/output devices on the device bus 34 and to call the resource manager to perform various software operations.

The Puller Circuit, Current Address Registers, and Translation Table

Figure 7:
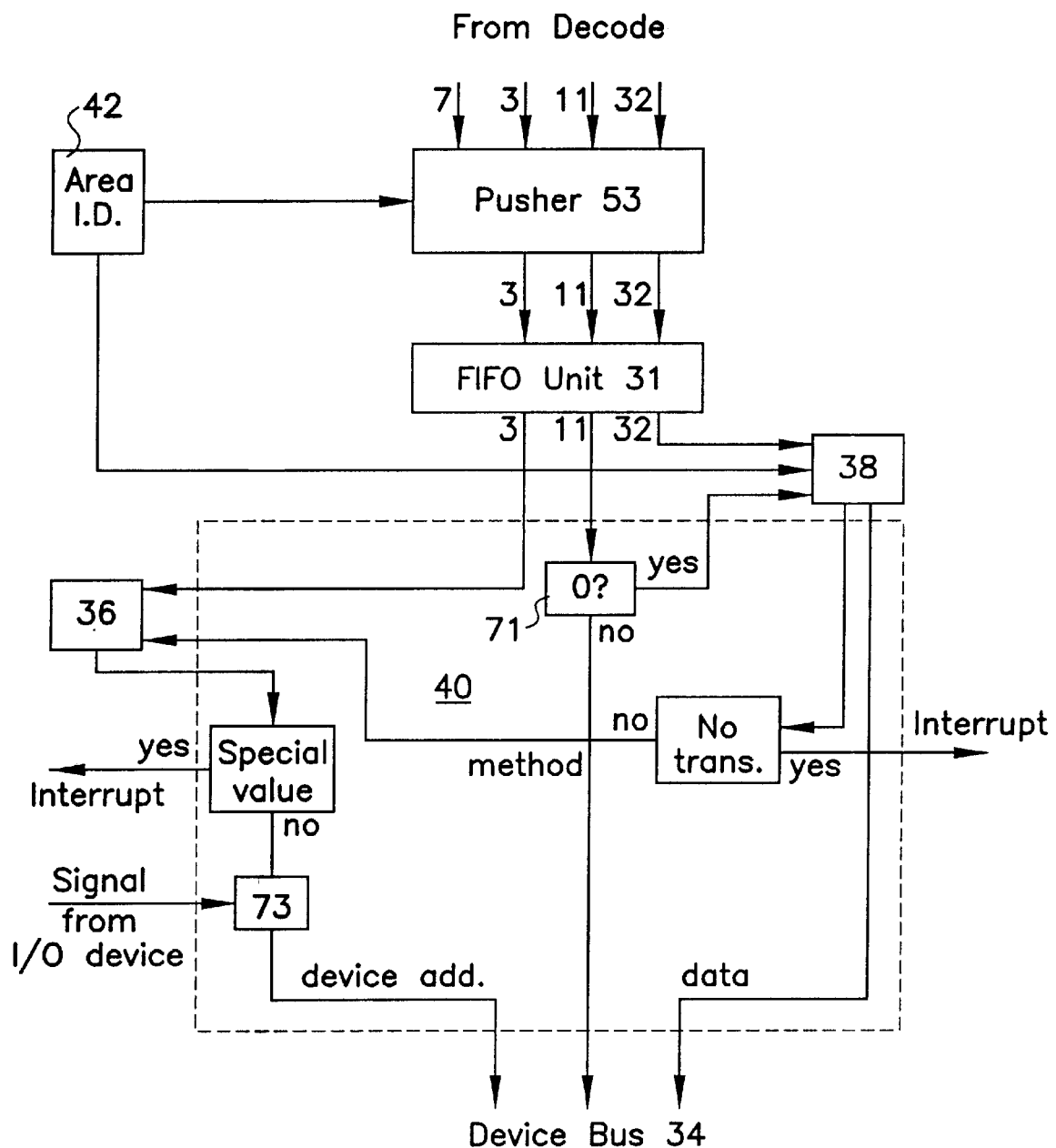
FIG. 7 is a block diagram illustrating in more detail specific portions of the circuitry shown in FIG. 6.

These operations are accomplished by various circuitry and the resource manager, particularly by a puller circuit 40, a current physical address table 36 which includes space for eight address translations for devices presently in use, and a translation table 38 which may include a much larger number of safe address translations. In order to correctly direct the address and data provided in each command to an input/output device, the FIFO buffer 31 includes a circuit 40 called a puller which reviews the command about to be executed. The puller circuit is illustrated in more detail in FIG. 7. The puller circuit 40 looks at the address of the bottom command in the FIFO buffer 31. The puller circuit 40 uses the three sub-area bits of the address to determine which of the eight sub-areas (current address registers) of the table 36 is to be searched for an address translation or is to receive the result of a lookup in the translation table 38.

Writes to Zero Offset

The puller circuit 40 also includes logic 71 which then determines whether the next eleven method bits of the address are all zero. If the eleven method bits are all zero, this indicates a write to the zero offset which is the special calling method used for indicating that an application wants a new translation for an input/output device; and the puller circuit 40 sends the data to the translation table 38 along with the upper seven bits from the address indicating the area and performs a lookup. When the write is to this special calling method (zero offset), the data is the virtual name of a device. The result of the lookup is usually a safe translation which includes an address on the device bus 34 and an instance number defining context for an input/output device which are placed in a register of the table 36. When the physical address and instance number are placed in the register of the table 36, the puller circuit sends the seven bits indicating the area and the instance number to the input/output device to change the context on the device. This is the manner in which translations are made available for immediate use. If the translation for the physical object does not exist in the translation table 38 of the input/output control unit 29, however, the input/output control unit returns a miss. This transfers the operation to the resource manager. The resource manager places a special value (all zeros in one embodiment) in the appropriate register of the table 36 and uses the command at the bottom of the FIFO buffer to perform whatever software operation is required by the command.

Writes to Non-zero Offset

If the offset is not zero, the puller circuit 40 takes the three bits indicating the sub-area and indexes into the table 36 to the proper register to find the device bus physical address. The puller circuit 40 concatenates that address with the eleven bit offset designating the method and writes the method and thirty-two bits of data to that physical address on the bus 34. A circuit 73 disables the transfer of the device address so that no command is sent if a signal indicates the input/output device is not ready because it does not implement the command. Moreover, if the value read from the sub-area of the table 36 is a special value which indicates a failed translation, this value generates an interrupt which calls the resource manager. The resource manager then uses the command at the bottom of the FIFO unit 31 to perform whatever software operation is required by the command. This helps assure that unsafe operations are handled by the operating system. It also allows the resource manager to be used to carry out in software various operations which are not implemented by a particular input/output device.

Figure 5:
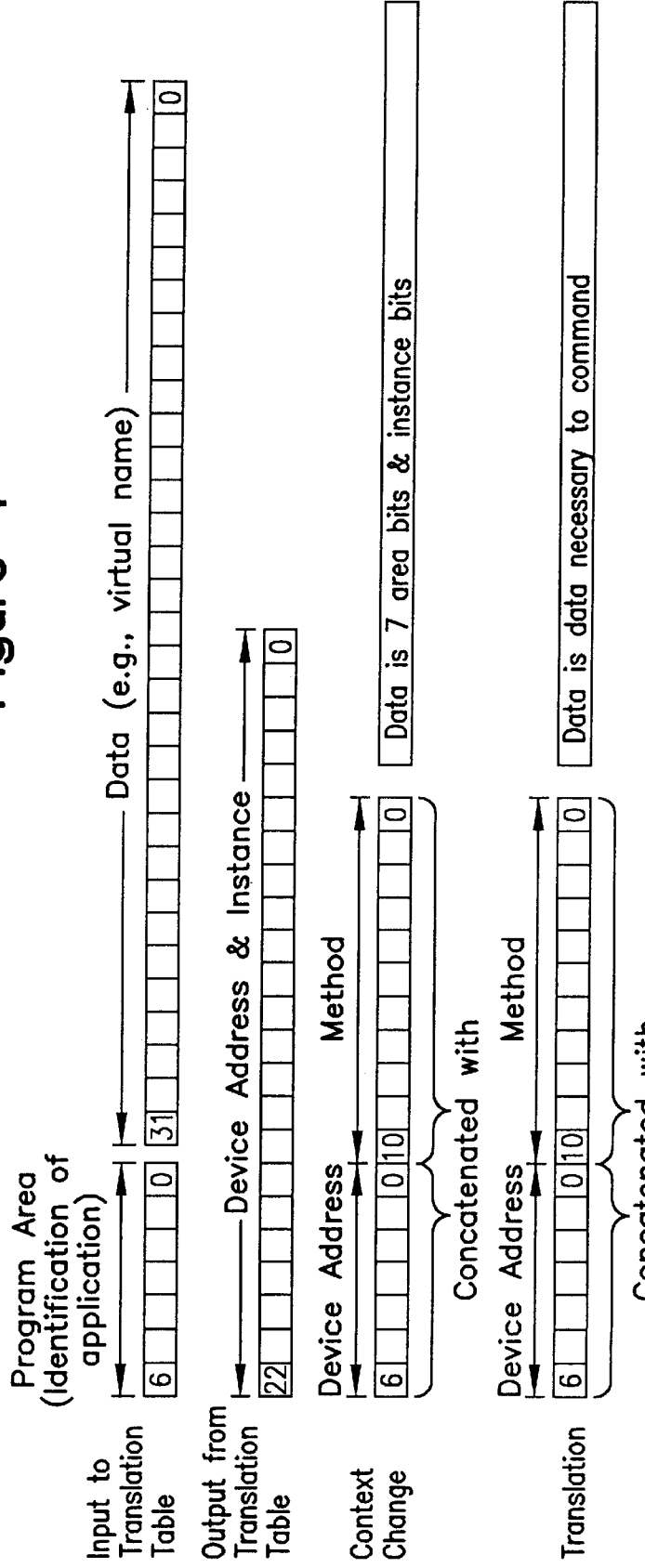
FIG. 5 is an illustration of entries in a translation table used in accordance with the invention.

FIG. 5 illustrates in the first two lines one entry in the translation table 38 utilized in one embodiment of the present invention. As may be seen, the seven bits of the address designating the area assigned to an application program and the thirty-two bit virtual name translate into twenty-three bits, seven of which indicate the address of the physical device on the device bus and sixteen of which indicate the instance of the data structure which provides the context to be placed on the input/output device. Each of the last two lines of FIG. 5 indicates one way in which the bits obtained in the translation are used. The eleven bits indicating the method invoked are concatenated with the physical address for the device retrieved from the translation table 38, and the concatenated value is placed on the bus 34 with data. Each of the input/output devices decodes addresses on the bus 34 to determine if it is the addressed device and responds accordingly to the operation indicated by the method.

Placing a Translation in the Table 38

When an application program first writes to the area which it has been allotted by the operating system and indicates that it desires to use an input/output device, the command is ultimately reviewed by the associated puller circuit 40. The puller circuit will find that the application program has selected one of the sub-areas using the three bit sub-area designation, selected an offset zero using the eleven bits, and has written a name for a particular input/output device in the thirty-two bit data space. When a zero value is written as the eleven bit offset to any one of the sub-areas, this instructs the input/output control unit 29 to make available that one of the sub-areas to the newly-named object and to interpret eleven bit offsets within the sub-area as the various methods which are available to an object of that class.

When the application program writes the name of an object as data to offset zero of a sub-area, the puller circuit 40 takes the virtual name, adds the seven bits designating the area, and looks up the concatenated value in the translation table 38 to obtain the physical address on the device bus 34 and the instance number of the physical device which is responsible for the operation represented by the particular object being named. If a translation is in the table 38 and the object represents a line drawing device, the physical address on the bus 34 of the line drawing hardware in the graphics rendering engine should be returned. When the physical address is returned, it is placed in one of eight positions (registers) of the current physical address table 36 designating the sub-area to which the zero offset was written. If the translation for the physical object does not exist in the translation table 38 of the input/output control unit 29, however, the input/output control unit returns a miss. This transfers the operation to the resource manager. The resource manager places a special value (all zeros in one embodiment) in the appropriate register of the table 36 and uses the command at the bottom of the FIFO buffer to perform whatever software operation is required by the command.

On a first write to the input/output device by an application program, there will be no translations for that object name in the translation table; and the operation will be transferred to the resource manager. The resource manager in the preferred embodiment of the invention has access to the database which includes the data structures for objects which include the safe translations to the physical addresses of the input/output devices. These objects may represent hardware or software which implements various portions of the input/output operations.

The resource manager reviews the details of the command being written and determines that is a write to a zero offset. The resource manager uses the seven bits designating the area allotted to the application program and the thirty-two data bits providing the virtual name given by the application to find objects in its database. When it determines that this is a name for one of the named objects associated with the input/output control unit 29, the resource manager looks up the data structure for that object and makes that object immediately available. To make the object immediately available, the resource manager allots the sub-area to the predefined object and also places a translation in the table 38. If the object is a software object, the resource manager also places a special code in the table 36 to indicate that the object is a software object and the resource manager is to be called when the object is addressed.

Finally, the resource manager restarts the write operation. The lookup in the translation table 38 then succeeds. This causes the physical address and instance value to be placed in the register of the table 36 and the puller 40 to send the seven area bits and instance value to the input/output device to change the device context.

When the physical address on the device bus 34 and the instance value of the device corresponding to the current object are first placed in a register of the current address table 36, the address is used by the puller to send the instance value and the seven bits indicating the application program (and the address area) to the device on the device bus 34 (see line three of FIG. 5). The device compares the seven bits and the instance value to the area and instance it is presently utilizing. If they differ, the device changes its context or interrupts the resource manager to change its context so that the device is properly initialized for the application program.

When an application program writes the virtual name of an object to offset zero in one of the sub-areas, and when the lookup in table 38 of that virtual name succeeds, the physical address of the corresponding device on the device bus 34 and the instance value are also stored in a slot of the eight entry current physical address table 36 which slot corresponds to the sub-area to which the virtual name was written. The table 36 stores the physical address on the device bus 34 of the device corresponding to the current object accessible in that sub-area, if there is such a device. If there is not a physical device or there is no translation in the table 38, the entry stores the special value which has no translation and therefore causes the input/output control unit 29 to interrupt into the resource manager.

Writing Directly to Input/Output Devices

After the physical address on the device bus 34 of the device corresponding to the current object has been placed in the current address table 36, when a next write occurs to that object as indicated by the three bits of the address selecting the particular sub-area, the offset address will typically be other than zero. This offset will indicate the method invoked on the object. This offset (indicated by the eleven bits) is concatenated with the physical address held in the table 36 (see line 4 of FIG. 5) and broadcast on the device bus 34 to select the particular input/output device and the operation indicated by the method which is to be performed by that device. All of the devices on the device bus 34 listen on the bus and decode commands addressed to them.

Current Address Registers and Sub-areas

Since eight sub-areas are available at once through the current address table 36, an application program may write up to eight virtual names for devices the application desires to utilize in input/output operations and have physical addresses for those devices immediately available by simply writing the virtual name to the zero offset of a sub-area. Thus, up to eight objects (devices) may have address translations immediately available in the table 36 for the application program using the FIFO unit 31.

The eight sub-areas available provide a large number of output options for an application program. The availability of eight sub-areas allows the application to accomplish a number of functions without the necessity of a translation table lookup and thus speeds input/output operations. However, since any application program may need to have access to all of the input/output assets which are available, the system provides a rapid manner of providing assets in addition to the eight devices which are represented by objects which fill the eight sub-areas allotted to that application program. When all of the eight sub-areas have been used by an application program so that input/output-to-device bus physical address translations for a device exist in each of the eight spaces in the table 36 and the application program running desires to write to a different input/output device, the application program may select a new device which it desires to use and place its address translation in the table 36 in place of any address translation presently occupying one of the registers. To accomplish this, the application program writes a new virtual name of a device as data directed to the zero offset of any of the eight sub-areas. This causes the input/output control unit 29 to replace the object presently occupying the sub-area with a new object representing the device indicated by the newly presented virtual name.

This is accomplished by the puller circuit 40 initiating a lookup in the translation table 38 and a replacement of the physical address in the table 36 designating the object in the sub-area with the physical address of the new device if a translation for the new object for the physical device has already been placed in the translation table 38 by the resource manager. Whenever an application program places a different translation in a register of the table 36, the change of address causes the puller to send the area bits and the instance value to the input/output device to change any required context.

Whenever any object is named for which the physical address is not in the physical address table 36 but for which a translation is available in the translation table 38, the lookup of that virtual name succeeds, the physical address and instance number of the corresponding device on the device bus 34 is stored in a slot of the current physical address table which corresponds to the sub-area to which the virtual name was written. Thereafter, writing to an offset to this sub-area will indicate a method invoked on the new object in the sub-area. This method (indicated by the eleven bits) is concatenated with the physical address held in the table 36 and broadcast on the device bus 34 to select the particular input/output device and the operation (indicated by the method) which is to be performed by that device. In this manner, the tables 36 and 38 act as a two level cache for object name translations which the application utilizing the FIFO unit 31 may immediately access and makes an extraordinarily large number of operations available even though the physical address space allotted to the program is limited.

Unimplemented Commands

Although 2048 operations are available for each object which is physically on the device bus 34, it is probable that some number of the operations (methods) will not be implemented in hardware. The input/output device detects whether an operation is implemented in hardware by an internal decoder which decodes only those addresses which are actually implemented. A write to an address which is not implemented is stored (both address and data) in a register 59 on the input/output device (see FIG. 3). When an input/output device receives a command including a method it cannot carry out, the device also generates an interrupt indicating that the hardware cannot deal with the operation. The interrupt calls the software of the resource manager so that the resource manager may accomplish the operation. This allows those operations which are invoked very infrequently to be carried out in software, while those operations which are used frequently are implemented in hardware in order to speed up the system. In order to assist this operation, each input/output device on the device bus 34 also provides a signal to the puller circuit 40 to signal the puller circuit that no commands are to be transferred to the input/output device which has generated the interrupt until the interrupt servicing has been completed. This signal to the puller circuit is sent to a circuit 73 to disable the transmission of the device address on the bus 34.

The Present Invention

The present invention provides significant increase in the speed with which commands are transferred from an application program without manipulation by the operating system while retaining the ability to handle safely operations which I/O devices are not adapted to process.

One problem encountered in trying to raise the speed with which command data is transferred from an application to an I/O device is caused by the need for the I/O control unit to keep track of the FIFO buffer space available and to furnish this information in a local register on the I/O control unit. The central processor reads the register for the condition of the FIFO buffer before sending any new sequence of data to an I/O device. This read operation by the central processing unit requires an interruption of other processor and bus processes, acquisition of the bus 27 by the central processing unit 21, and a read access across the bus 27 to assure that there is space available before the central processing unit can begin the transfer of additional data to the bus control unit 25. The need for the central processor to read the amount of space available in the FIFO buffer before sending any additional data slows the transfer of the graphics data to I/O devices significantly. Other problems slowing the speed of transfer relate to the physical size of the I/O FIFO buffers which may be implemented.

The present invention provides an improved method of transferring command data to I/O devices. The improved method allows very large amounts of data to be transferred to an I/O device such as a graphics accelerator without using the central processing unit and eliminates the need for the central processor to read the space available in an accelerator buffer thus significantly increasing the speed of the transfer. To accomplish these results, the present invention defines one or more areas in system memory to which an application program may write commands to be transferred to the I/O FIFO circuitry. The present invention then utilizes the DMA circuitry to determine the space available in the I/O FIFO buffer and to transfer commands from the transfer buffer to the I/O FIFO buffer. This eliminates the need for the central processor to read an I/O register and allows much more data to be transferred more rapidly.

Figure 8:
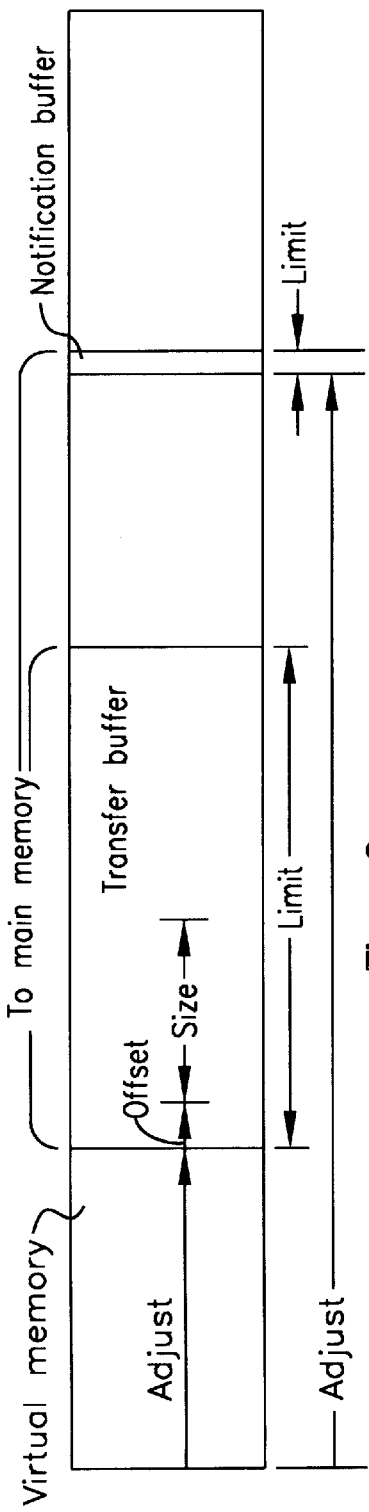
FIG. 8 is a diagram illustrating portions of memory utilized in one embodiment of the invention.
Figure 9:
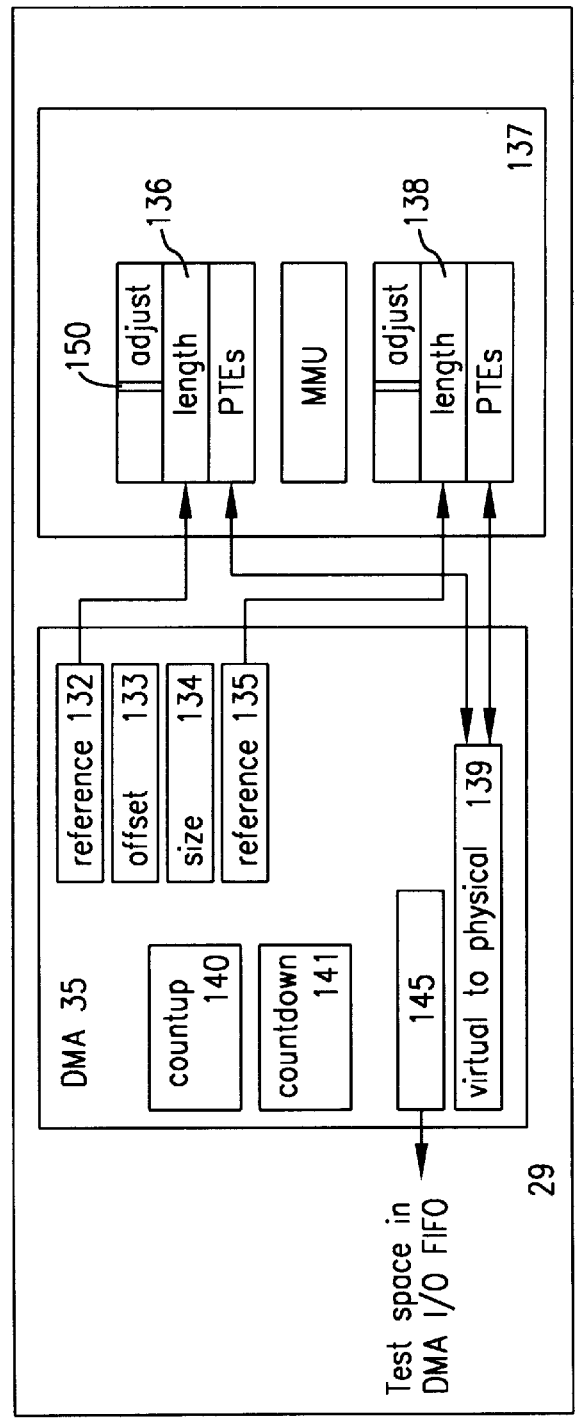
FIG. 9 is a diagram illustrating a portion of a particular embodiment of the invention.

The DMA transfer may be accomplished by various circuitry. However, in one embodiment, the invention defines a first large area in virtual memory which is used as a transfer buffer and a second area in virtual memory which is used to hold notifications of the status of any transfer (see FIG. 8). In this embodiment, an application program desiring to write to the I/O device utilizes the driver for the I/O device to establishes first and the second data structures 136 and 138 (see FIG. 9) which define the portions of memory which are the transfer and notification buffers. The driver receives from the application the data describing the portion of memory in terms of a virtual address, a range, and an application identification. The driver uses the application identification to obtain copies of the page tables from the system memory controller which may be used to provide translations from the virtual addresses furnished by the application program, causes the operating system to move the pages designated by the data structure into main memory, and provides a reference value to the DMA engine which points to the data structure.

When the operating system copies the pages designated by the data structure as the transfer buffer memory area to main memory, it locks the pages so that they cannot be paged out of main memory. The invention then utilizes the DMA engine at the I/O control unit associated with the I/O device to transfer the graphics data directly from the main memory transfer buffer to the I/O device typically in response to application commands. The only use of the central processing unit is to transfer data to the buffer area of main memory from virtual memory space in response to application write instructions, to transfer the initializing commands from the application defining a specific data sequence to the DMA engine, and to read a notification buffer in main memory to determine the status of any DMA transfer which has commenced In one embodiment of the invention shown in FIG. 9, the DMA engine 35 is positioned as a part of the I/O control unit 29 joined to the I/O device to which the data is to be transferred. In this embodiment, the DMA engine 35 includes at least four individual registers 132–135 which are utilized in carrying out the invention. A first register 132 includes a reference value pointing to a data structure 136 which defines the transfer buffer which is established in main memory to hold the data to be transferred to the I/O device. This reference value is furnished by a software driver for the I/O device utilized by the application program to set up the data structure defining the buffer.

The data structure 136 may be placed in any portion of memory which is convenient to the operation. In the embodiment illustrated, the data structures defining the transfer buffer and the notification area are each conveniently stored in local memory 137 on the I/O control unit 29 adjacent the DMA engine 35. The data structure 136 in this embodiment (shown in FIG. 9) includes a virtual memory address (adjust) at which the buffer begins and a value indicating the extent (the length) of the buffer from the virtual memory address. These values allow a transfer buffer of any convenient size to be established. For example, a transfer buffer of two megabytes may be a reasonable size for handling transfers of graphics data to a graphics accelerator device. On the other hand, the size of the data buffer is limited only by the amount of space available in main memory and depends entirely on the individual computer arrangement involved.

The data structure 136 of the described embodiment also includes an indication of the page table entries which provide the address translation structures for the particular application. Since an application program is aware of only virtual memory addresses in a system using virtual memory, the virtual memory addresses furnished by the application program are translated to physical addresses in main memory at which data actually resides so that the data may be accessed by the central processor and otherwise referred to during any transfers. Historically, the operating system accomplishes this address translation. However, by indicating the page table entries in the data structure and copying the page tables to available off-screen memory 137 on the I/O control unit 29 as is shown in the illustrated embodiment, the DMA engine itself is made capable of accomplishing any translations necessary during the transfer without requiring an interrupt to the central processor for obtaining assistance from the operating system for address translation. This allows an application program to write the commands directly to the DMA engine 35 without the delays attendant upon waiting for translation by the operating system. The DMA engine includes circuitry 139 such as a state machine which uses the page table information to translate virtual to physical addresses during transfer of the data from the buffer to the I/O device.

Of course, it is also possible to utilize the architecture with the slower address translation process practices by the operating system typical of the prior art. If this address translation process is utilized with the architecture with the operating system translating the virtual address from the application to a physical start address for the data structure, then a physical address for the data structure defining the transfer buffer would be placed in the data structure and page table entries would not be required. It would also be possible to utilize the architecture without the facility for writing directly to I/O devices if the operating system accomplished the address translations and security checks. However, such a process would be slower because it would necessitate the operating system being involved in all address translations and would eliminate the ability of an application to selectively pick different I/O devices without operating system intervention.

Thus, the result of the creation of the first data structure 136 is a constant area in main memory at which a transfer buffer of a size limited only by main memory size is positioned. When such a data structure has been completed by the application and driver, the driver causes the pages designated by the data structure to be copied to main memory from wherever they are positioned in virtual memory and to be locked down so that they cannot be removed. At this point, the data structure defines an area of main memory (designated by the virtual application address, extent, and page table entries) which may be used as a buffer by any I/O device associated with the DMA engine.

It should be noted that other data may also be a part of the data structure which defines a transfer buffer. For example, in one embodiment of the invention, the data structure includes an indication 150 of the position at which the transfer buffer is placed. Although it is especially useful for increasing the speed of writes to I/O devices, in some situations it is desirable to be able to create a large buffer in memory other than main memory (for example, memory 137 which is associated with the DMA engine 35 on the I/O control unit 29) from which the DMA engine may rapidly transfer data to other portions of an I/O device. In one case, a single bit indication 150 may be kept in the data structure 136 for indicating either main memory or another portion of memory (such as off-screen memory on a graphics accelerator) in which the buffer is to be established. Indications using a larger number of bits may be used for selecting among other areas of local memory.

In the same embodiment of the architecture, the fourth register 135 holds a reference value pointing to a second notification data structure 138. This second data structure defines a second region of main memory 20 which is used as a notify area for holding inter alia the status of transfers of data from the first memory area. This second data structure is defined in the same manner as the first by a virtual address, a length, a page table entry, and possibly an indication whether the notification area is a portion of main memory or some other memory area. Since the second data area is also typically in main memory, a read of the area by the central processing unit need not transit the system I/O bus and therefore takes a very small amount of time. This is to be contrasted to the read of a register on an I/O device necessary in the arrangement described in the above-mentioned patent to determine the status of a buffer on the I/O device.

Once the application has created the transfer and notify data structures, the application cause s any data which is to be transferred to the I/O device to be written to a particular virtual address within the address range defined for the buffer. In this manner, the application program may transfer individual sequences of data to positions in the buffer which exists in main memory.

The application program commands a transfer of a particular sequence of data from the transfer buffer in memory to an I/O device in one embodiment by writing commands directly to the I/O control unit 29 (and thus the DMA engine 35) furnishing the offset (address) of the buffsequence of data from the beginning of the memory buffer and providing the size of the data to be transferred to the DMA engine. The DMA engine receives the commands and causes the offset and size values to be written to the second and third registers 133 and 134 associated with the DMA engine 35 in the embodiment described to define a particular position in the memory buffer from which a transfer is to take place. The DMA engine uses a state machine 145 to determine whether space is available in the I/O FIFO buffer before commencing any transfer. If space is available, the transfer may begin.

Since the DMA engine has a value pointing to the virtual address of the buffer and the virtual-to-physical page table entries for the data to be transferred, the DMA engine may easily apply an offset into the buffer space and determine the main memory address of the data sequence. Using the offset and size furnished, the DMA engine is able to determine the physical address of the data sequence in the memory buffer without intervention by the operating system.

The DMA engine responds to the offset and size commands from the application program by determining the physical address of the sequence of data to be transferred using the virtual address and the limits described by the application in the first data structure and applying the offset and size values to the buffer area. The DMA engine begins the transfer of data from the buffer area indicated and continues the operation for so long as there is data to be transferred as designated by the size of the data. In the embodiment utilizing the I/O control unit 29 and allowing direct writing, the data (which includes commands including virtual addresses of I/O devices and associated data) is transferred by the DMA engine is sent to the input FIFO buffer of the I/O control unit.

In one embodiment of the invention, the DMA engine includes circuits 140 and 141 for incrementing the value of the offset and decrementing the value of the size as each individual portion of data is transferred to the I/O device. When the transfer is complete, the DMA engine 35 consults the reference value in the fourth register 135 to determine the memory address of the second data structure. Since this data structure defines a second area of main memory at which a notify structure is positioned, using the application's virtual address, length, and page table entry, the DMA engine is able to determine the physical address in main memory of the notification area without consulting the operating system.

Essentially, the notify structure includes an indication of the status or condition of the DMA transfer operation, i.e., continuing or completed. The DMA engine writes a value to the notification area of memory indicating the transfer operation is complete and signals the central processing unit (typically by an interrupt) that the notification area of main memory is to be interrogated to determine the condition of the transfer operation. The central processing unit responds to the signal, reads the notify area, determines that the transfer is complete, and then may execute the next transfer commands (which include the offset and size) from the application program signaling a next portion of the buffer containing a next sequence of data to be transferred by the DMA engine to the I/O device.

All that is necessary to accomplish a transfer once the transfer and notify data structures have been established is that the application program write the data sequence to the buffer and transfer to the DMA engine the offset and length of the data to be transferred. Since the process of establishing of the first data structure causes the driver to fill the first register 32 with a reference value pointing to the first data structure and the fourth register 35 with another reference value pointing to the notify data structure and causes the designated pages to be moved into main memory and locked down, these commands furnish all that is necessary for the transfer to begin and complete. Then, the DMA engine consults the notify structure for the address of the notify area, stores the notify in the second notify area of memory, and signals the central processing unit to read the notify area. When a read of the notify area indicates that the operation is complete, a next operation may be commenced.

The invention allows large amounts of data positioned at addresses in system memory to be transferred to the graphics accelerator by the DMA with a minimal number of starting commands from the central processor. As may be seen, once the data structure has been establish and data sequences moved to the transfer buffer, the transfer operation requires only two processor writes and a read. Consequently, this is a very rapid operation. Moreover, since the read by the central processor is of a main memory notification area, the read can be accomplished much more rapidly than can a read of an I/O register (as has been required of prior art arrangements). An added advantage is that the DMA engine knows when the I/O control unit is ready for data, so data overflow is no longer a problem.

The process can be made faster still by increasing the number of transfer buffers in memory in which I/O data may be stored and associated notification areas. Doing so requires increasing the number of data structures defining transfer buffers and notification areas of memory. It also requires furnishing additional registers for the DMA engine to hold the reference values for these data structures, and additional registers for holding offset and size values for the data sequences. Although these requirements are significant, the increase in the number of transfer buffers allows an increase in the number of notify areas. Since the notify operation is the limiting factor in the operation, increasing the number of areas in memory defining notify areas allows a DMA engine to make use of multiple channels to accomplish transfers and essentially overlap those transfers without the need to wait for a first to complete the notify operation. With additional portions of memory and accompanying data structures, the commands required of the application program which must be executed by the central processing unit may be overlapped to utilize time otherwise unused by the processor. This allows much faster operations although it does increases the system requirements.

Not only are transfers accomplished much more rapidly utilizing the DMA circuitry of the present invention, the DMA circuitry cooperates with the circuitry of the I/O control unit 29 to utilize the features by which safe transfers may be accomplished even though the operating system software is not involved in monitoring all of the command data transferred. Thus, the DMA transfer arrangement cooperates with the decoding circuitry described above to assure that only functions which an associated input/output device can actually carry out are able to reach the input/output device and that commands which are not safe are routed to the operating system for handling.

Although the present invention has been described in terms of a preferred embodiment, it will be appreciated that various modifications and alterations might be made by those skilled in the art without departing from the spirit and scope of the invention. For example, other specific arrangements for accomplishing DMA transfers may be devised by those skilled in the art which accomplish the similar results as the particular embodiment illustrated herein. Moreover, other arrangements for detecting that a I/O device is unable to handle data, addresses, or commands being transferred to it by a DMA and generating an interrupt or other signal by which the failure may be handled fall within the terms of this invention. For example, data alone may be tested by detector circuitry to determine if its pattern is a pattern acceptable to an I/O device; or a command alone may be tested by detector circuitry to determine if it is a command acceptable to an I/O device. For that reason the terms "DMA-transferred data" and "DMA-transferable data" are used to include any one or more of data, addresses, or commands. The invention should therefore be measured in terms of the claims which follow.

What is claimed is:

1. An input/output device adapted to be used in a computer system comprising a direct memory access (DMA) circuit for transferring DMA-transferable data from an application program to the input/output device without manipulation by an operating system;

a circuit for detecting DMA-transferable data transferred by the (DMA) circuit which the input/output device to which the input/output device is unable to respond;

a circuit for storing the DMA-transferable data transferred to the input/output device to which the input/output device is unable to respond;

an interrupt generating circuit responsive to a determination that the input/output device is unable to respond to DMA-transferable data;

a signal generating circuit responsive to a determination that the input/output device is unable to respond to DMA-transferable data; and a flow control circuit for receiving DMA-transferable data being transferred to the detecting circuit, the flow control circuit responding to a signal generated when the input/output device is unable to respond by halting the flow of DMA-transferable data to the input/output device.

2. An input/output device as claimed in claim 1 in which the circuit for detecting DMA-transferable data transferred by the DMA circuit to which the input/output device is unable to respond comprises:

a first decoding circuit for decoding a range of addresses, and a second decoding circuit for decoding all commands to which the input/output device is able to respond.

3. An input/output device as claimed in claim 2 in which the circuit for detecting DMA-transferable data transferred by the DMA circuit to which the input/output device is unable to respond further comprises a buffer storage circuit for receiving commands from the first decoding circuit and furnishing commands to the second decoding circuit.

4. A computer comprising a central processing unit;

a system bus;

main memory; and an input/output device including a direct memory access (DMA) circuit for transferring DMA-transferable data from an application program to the input/output device without manipulation by an operating system, a circuit for detecting DMA-transferable data transferred by the (DMA) circuit which the input/output device to which the input/output device is unable to respond, a circuit for storing DMA-transferable data transferred to the input/output device to which the input/output device is unable to respond, an interrupt generating circuit responsive to a determination that the input/output device is unable to respond to DMA-transferable data, means for generating a signal if the input/output device is unable to respond to DMA-transferable data, and a flow control circuit for receiving DMA-transferable data being transferred to the decoding circuit, the flow control circuit being adapted to respond to an interrupt generated when the input/output device is unable to respond to DMA-transferable data by halting the flow of DMA-transferable data to the input/output device.

5. A computer as claimed in claim 4 in which the circuit for detecting DMA-transferable data transferred by the DMA circuit to which the input/output device is unable to respond comprises:

a first decoding circuit for decoding a range of addresses, and a second decoding circuit for decoding all commands to which the input/output device is able to respond.

6. A computer as claimed in claim 5 in which the circuit for detecting DMA-transferable data transferred by the DMA circuit to which the input/output device is unable to respond further comprises a buffer storage circuit for receiving commands from the first decoding circuit and furnishing commands to the second decoding circuit.

7. A method for controlling the flow of DMA-transferable data to an input/output device in a computer comprising the steps of:

transferring DMA-transferable data from an application program to the input/output device using a direct memory access (DMA) circuit, ascertaining whether the input/output device is able to respond to the DMA-transferable data, storing the DMA-transferable data transferred to the input/output device to which the input/output device is unable to respond, and generating an interrupt if the input/output device is unable to respond to DMA-transferable data interrupting a flow control circuit for receiving DMA-transferable data being transferred to the input/output device when the input/output device is unable to respond to DMA-transferable data by halting the flow of DMA-transferable data to the input/output device.

8. A method as claimed in claim 7 in which the step of ascertaining whether the input/output device is able to respond to DMA-transferable data comprises decoding all DMA-transferable data to which the input/output device is able to respond.

9. A method as claimed in claim 8 in which the step of ascertaining whether the input/output device is able to respond to DMA-transferable data further comprises storing DMA-transferable data received from the flow control circuit in a buffer storage circuit and furnishing DMA-transferable data to the decoding circuit.

* * * * *